Oct. 13, 1953

H. J. DUNKELOW 2,655,167

CONTROL VALVE

Filed Sept. 20, 1949

Inventor:
Henry J. Dunkelow.

By John M Darley
Attorney.

Oct. 13, 1953 — H. J. DUNKELOW — 2,655,167
CONTROL VALVE
Filed Sept. 20, 1949 — 2 Sheets-Sheet 2
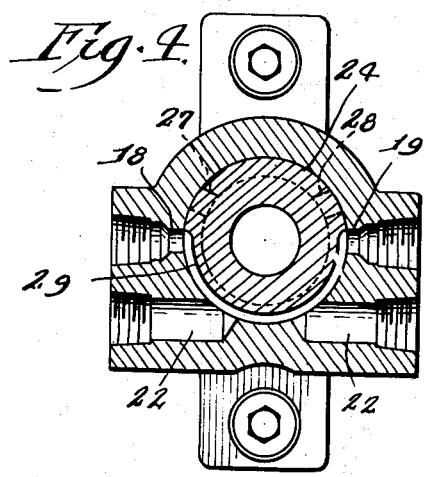
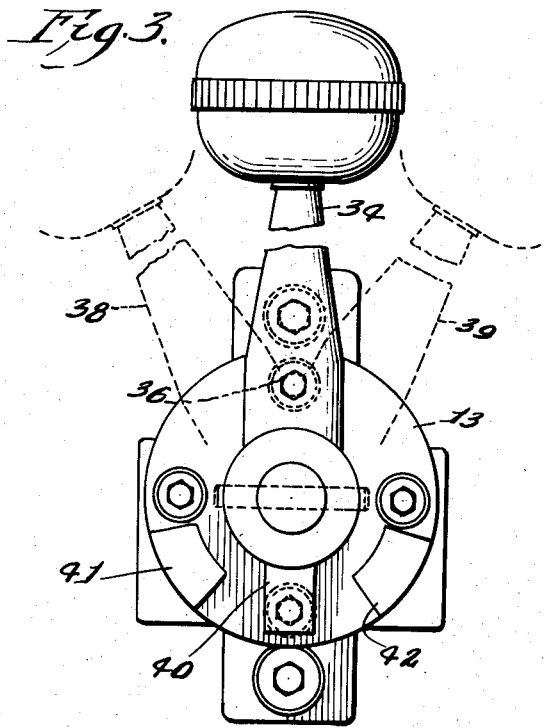
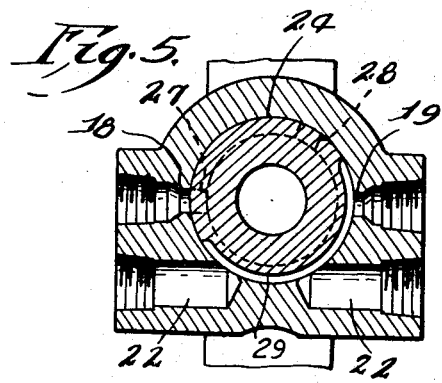
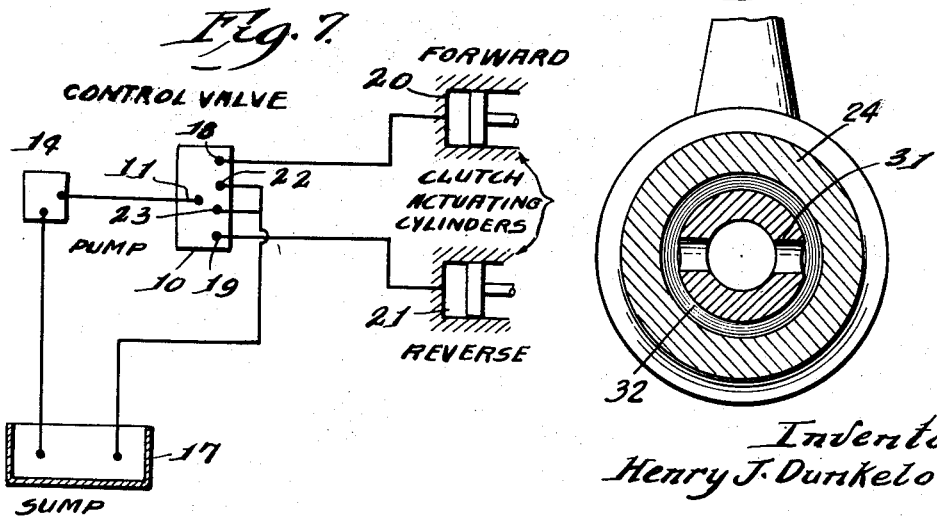
Inventor:
Henry J. Dunkelow.
By John M. Darley
Attorney.

Patented Oct. 13, 1953

2,655,167

UNITED STATES PATENT OFFICE 2,655,167

CONTROL VALVE

Henry J. Dunkelow, Racine, Wis., assignor to Twin Disc Clutch Company, Racine, Wis., a corporation of Wisconsin Application September 20, 1949, Serial No. 116,665

5 Claims. (Cl. 137—102)

My invention relates to a control valve and more particularly to a device for selectively controlling the operation of a plurality of hydraulically actuated clutches.

While having universal application, the valve will be described in connection with a marine gear including forward and reverse drives which are respectively conditioned for operation by forward and reverse, hydraulically operated clutches which are selectively controlled, the working liquid being an oil. A characteristic arrangement of this nature is disclosed in U. S. Letters Patent No. 2,464,538.

One object of the invention is to devise a control valve whose position not only determines the engagement of either clutch or a neutral position of both clutches, but is also characterized by a pressure regulating action which insures the application of an adequate pressure to the engaged clutch.

A further object is to provide a valve of the character indicated which, when occupying a forward or reverse drive position will prevent the application of hydraulic pressure to the corresponding clutch until such pressure attains a working value.

A further object is to provide a valve as set forth above which may be conditioned to direct pressure oil from the pump to the engaged clutch and displaced oil from the disengaged clutch to a sump.

A further object is to provide a valve which will hold a positive, neutral position while subjected to the full working pressure and which is further ineffective to pass any pressure where insufficient to meet the operating demands.

These and further objects of the invention will be set forth in the following specification, reference being had to the accompanying drawings, and the novel means by which said objects are effectuated will be definitely pointed out in the claims.

In the drawings:

Fig. 3 is an end view of the valve looking in the direction of the arrow 3 in Fig. 1.

Fig. 4 is a section along the line 4—4 in Fig. 1.

Fig. 5 is a section along the line 5—5 in Fig. 2, but showing the valve rotated to connect the inlet port with one delivery port and the other delivery port with an exhaust port.

Fig. 6 is a section along the line 6—6 in Fig. 1.

Fig. 7 is a schematic view showing by way of example the relation of the valve to a pair of clutch actuating cylinders.

Figure 1:
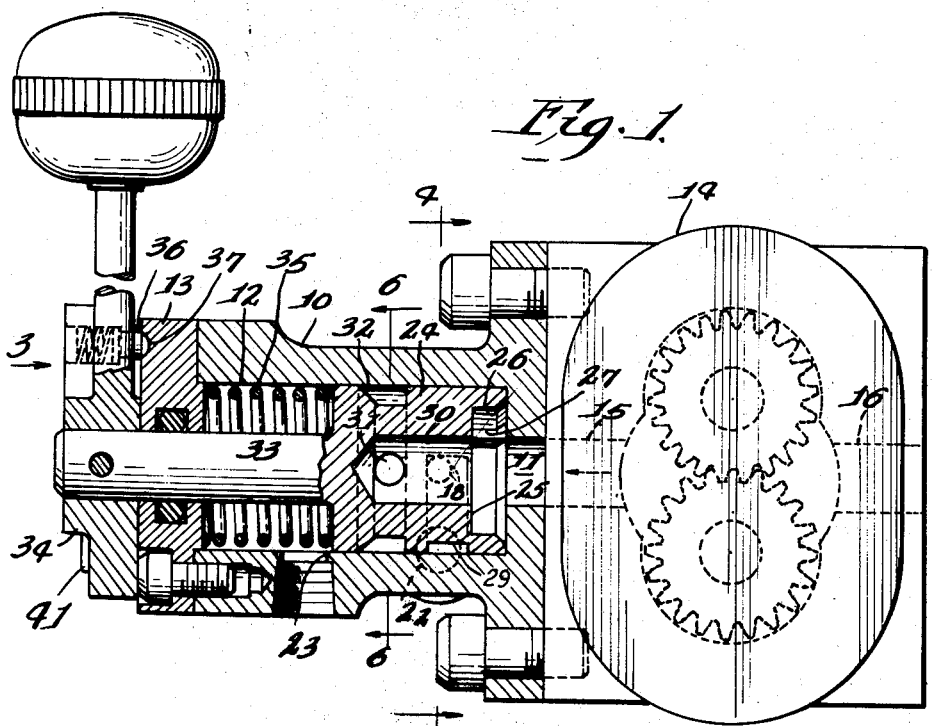
Fig. 1 is a sectional elevation of the valve in neutral position and either free from oil pressure or subjected to an inadequate pressure.

Referring to the drawings, the numeral 10 designates a valve casing having an inlet port 11 which communicates with one end of a cylindrical chamber 12 whose opposite end is closed by a cover plate 13. The inlet port end of the casing 10 may be flanged for attachment to a gear pump 14 whose outlet 15 registers with the inlet port 11 and whose inlet may be connected to a sump 17 (see Fig. 7) forming part of a marine gear, for example. The pump 14 is generally representative of any source of oil under pressure.

The casing 10 also includes a pair of diametrally related delivery ports 18 and 19 which may be respectively connected to forward and reverse clutch actuating cylinders 20 and 21 that are incorporated in the marine gear and are operably related to hydraulically actuated clutches (not shown), but disclosed in the above noted patent. Also provided in the casing is a pair of oppositely disposed, exhaust ports 22—22 which are coplanar with and positioned below the ports 18 and 19, and an overflow or bypass port 23 located in the bottom of the casing 10 and spaced axially thereof from the ports 18, 19 and 22. The ports 22 and 23 connect with the sump 17.

Figure 2:
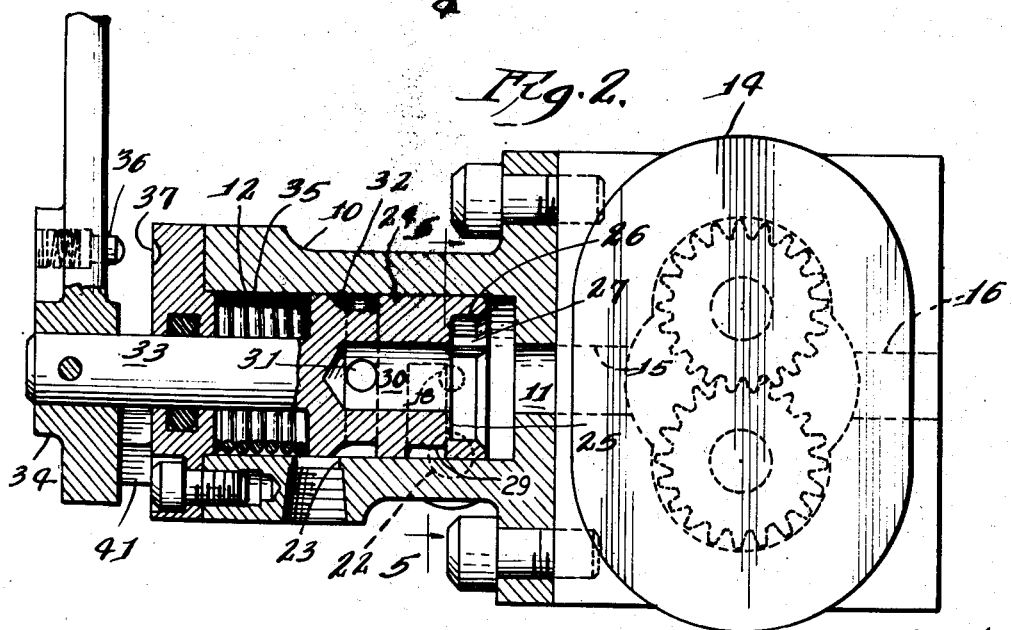
Fig. 2 is a view similar to Fig. 1, but showing the valve shifted by the oil pressure to a position from which it may be rotated to direct oil to any one of a plurality of outlets or delivery ports.

A piston valve 24 is slidably and rotatably mounted in the chamber 12 and the end thereof adjacent the inlet port 11 is axially counterbored at 25 and the annular lip 26 formed thereby is radially cut in two locations to provide slots 27 and 28 which, when the valve is in the neutral position shown in Figs. 1 and 4, lie above the delivery ports 18 and 19, respectively, and on opposite sides of the vertical axis of the valve. A partiannular groove 29 is cut in the periphery of the valve 24 in generally coplanar and overlapping relation to the ports 18, 19 and 22 such that, in any position of the valve, the groove 29 provides communication between the ports 18 and 19 and 22, or selectively between either port 18 and 19 and the ports 22. In the neutral position of the valve whether axially shifted or not, as illustrated in Figs. 1, 2 and 4, the ends of the groove 29 register with the ports 18 and 19 while the intermediate portion of this groove communicates with the ports 22. Extending axially inward of the valve 24 from the counterbore 25 is a pocket 30 which connects by way of a diametral passage 31 with an annular channel 32 in the periphery of the valve 24. When the valve occupies the non-shifted position shown in Fig. 1, the channel 32 is displaced from the overflow port 23, but is arranged to overlap the latter port to provide a relieving or pressure regulating flow when an adequate pressure is established by the pump 14 and the valve is in the shifted position shown in Fig. 2.

The valve 24 is provided with a stem 33 which slidably extends through the cover plate 13 for attachment to an operating handle 34. Between the plate 13 and the valve 24, a helical spring 35 encircles the stem 33 and is initially loaded to bias the valve in the position shown in Fig. 1, the spring yielding when the desired pressure is established in the inlet port 11. The handle 34 may occupy the neutral position shown in Figs. 1, 2 and 3, being shiftably held therein by a spring actuated detent 36 carried by the handle which seats in a shallow socket 37 formed in the plate 13, or selectively may be shifted to the dotted positions 38 and 39 which, in the case of a marine gear, may correspond to the forward and reverse positions thereof. In the two latter positions, respectively, a finger 40 depending from the handle 34 engages lugs 41 and 42 on the plate 13 as limiting stops.

In describing the operation of the valve, it will be assumed that the handle 34 is in the neutral position and that there is either an absence of or an insufficient pressure in the inlet port 11. The parts then occupy the several positions shown in Figs. 1 and 4, the delivery ports 18 and 19 being masked from the inlet port 11 and communicating with the exhaust ports 22 so that the forward and reverse cylinders 20 and 21 are free of oil pressure and the associated clutches are disengaged.

If now it is desired to engage the forward clutch, for example, the handle 34 may be immediately rotated to position 38, or this movement may be delayed until the valve 24 has been shifted axially by pressure in the inlet port 11 to the position shown in Fig. 2. In either case, after the valve has been shifted and rotated, or rotated and shifted as the case may be, its rotarial position is as shown in Fig. 5 in which the slot 27 registers with the delivery port 18, thereby connecting the inlet port 11 with the forward cylinder 20 to engage the associated clutch, while the other delivery port 19 still communicates with the exhaust ports 22 through the groove 29 since the width of the latter is sufficient to register with the ports 22 and at least one delivery port in any position of the valve. At the same time, the axial shifting of the valve, whether rotated in this position or not, connects the channel 32 with the overflow port 23 to thereby provide a relieving and pressure regulating flow through the valve as determined by the spring 35.

To again connect both delivery ports with the exhaust ports, i. e. the neutral position, the valve is rotated in the opposite direction to the position shown in Fig. 4 and if the pressure is still sufficient, the axial position of the valve is as shown in Fig. 2 wherein the relieving flow is discharged through the channel 32 and port 23, and the inlet port 11 is disconnected from both delivery ports 18 and 19. The actuation of the reverse cylinder 21 is achieved by rotating the valve 24 clockwise from the position shown in Fig. 4, and assuming a pressure shifting of the valve, the slot 28 then registers with the delivery port 19 while the delivery port 18 connects with the exhaust ports 22 through the groove 29.

From the foregoing, it will be noted that the valve provides a positive neutral under full control pressure since this pressure does not tend the valve towards either of its engaging positions and that it combines a pressure regulating action with a capacity for selecting the flow direction of the controlled liquid through the valve. Further, rotating of the valve does not produce any useful result until after it has been shifted by an adequate pressure in the inlet port. This characteristic protects the associated clutches by preventing the admission of oil to the related cylinders until this oil has attained a satisfactory pressure. Hence, the clutches are engaged with a minimum of effort and with an absence of sluggishness.

I claim:

1. A control valve comprising a casing having an inlet port, a delivery port and an overflow port, a pressure regulating, piston valve member in the casing having one end exposed to pressure in the inlet port and including a pair of passages in the member, the valve being shifted endwise by pressure in the inlet port to connect the inlet port with the overflow port through one passage and manually rotated to connect the inlet and delivery ports through the other passage, the inlet and delivery ports being connected only after the completion of the endwise and rotary shifts of the member, and spring means biasing the member against the endwise shift until a predetermined pressure exists in the inlet port.

2. A control valve comprising a casing having an inlet port, a pair of delivery ports and a pair of exhaust ports, a piston valve member in the casing having one end exposed to pressure in the inlet port and including a plurality of passages, the member being shifted endwise by pressure in the inlet port and manually rotatable to selectively connect the inlet port with one delivery port and the other delivery port with one of the exhaust ports through two of the passages, respectively, and including a simultaneous connection of each delivery port with an exhaust port through one of the passages in one selected position of the member, the inlet port and selected delivery port being connected only after the completion of the endwise and rotary shifts of the member, and spring means biasing the member against the endwise shift until a predetermined pressure exists in the inlet port.

3. A control valve comprising a casing having an inlet port, a pair of delivery ports, a pair of exhaust ports and an overflow port, a pressure regulating, piston valve member in the casing having one end exposed to pressure in the inlet port and including quadruple passages in the member, the member being shifted endwise by pressure in the inlet port to connect the inlet port with the overflow port through one passage and manually rotatable to selectively connect the inlet port with one delivery port through a second passage and the other delivery port with one of the exhaust ports through a third passage, to selectively connect the inlet port with said other delivery port through a fourth passage and said one delivery port with the other exhaust port through said third passage, and including a simultaneous connection of each delivery port with an exhaust port through the third passage in one selected position of the member, the inlet port and selected delivery port being connected only after the completion of the endwise and rotary shifts of the member, and spring means biasing the member against the endwise shift until a predetermined pressure exists in the inlet port.

4. A control valve comprising a casing having an inlet port, a pair of delivery ports and a pair of exhaust ports, a piston valve member in the casing having one end exposed to pressure in the inlet port and including a pair of passages, the member being shifted endwise by pressure in the inlet port and manually rotatable to selectively connect the inlet port with either delivery port while connecting the other delivery port with one of the exhaust ports through the passages, respectively, the inlet port and selected delivery port being connected only after the completion of the endwise and rotary shifts of the member, and spring means biasing the member against the endwise shift until a predetermined pressure exists in the inlet port.

5. A control valve comprising a casing having an inlet port, a pair of delivery ports, a pair of exhaust ports and an overflow port, a pressure regulating, piston valve member in the casing having one end exposed to pressure in the inlet port and including quadruple passages in the member, the member being shifted endwise by pressure in the inlet port to connect the inlet port with the overflow port through one passage and manually rotatable to selectively connect the inlet port with one delivery port through a second passage and the other delivery port with one of the exhaust ports through a third passage, and to selectively connect the inlet port with said other delivery port through a fourth passage and said one delivery port with the other exhaust port through said third passage, the inlet port and selected delivery port being connected only after the completion of the endwise and rotary shifts of the member, and spring means biasing the member against the endwise shift until a predetermined pressure exists in the inlet port.

HENRY J. DUNKELOW.

References Cited in the file of this patent

UNITED STATES PATENTS

| Number | Name | Date |
| --- | --- | --- |
| 477,706 | Rymer | June 28, 1892 |
| 1,138,187 | Bridges | May 4, 1915 |
| 1,357,294 | McKee | Nov. 2, 1920 |
| 1,809,938 | Hohulin | June 16, 1931 |
| 1,870,068 | Roberts | Aug. 2, 1932 |
| 1,902,231 | Gurley | Mar. 21, 1933 |
| 2,108,312 | Holmes | Feb. 15, 1938 |